United States Patent [19]
Klein

[11] Patent Number: 6,129,885
[45] Date of Patent: *Oct. 10, 2000

[54] PROCESS AND APPARATUS FOR PRODUCING CURVED HOLLOW BODIES OF THERMOPLASTIC MATERIAL

[75] Inventor: Martin Klein, St. Augustin, Germany

[73] Assignee: Krupp Kautex Maschinenbau GmbH, Bonn, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/103,259

[22] Filed: Jun. 23, 1998

[30] Foreign Application Priority Data

Jun. 27, 1997 [DE] Germany .............................. 197 27 366

[51] Int. Cl.$^7$ ............................ B29C 31/08; B29C 49/04
[52] U.S. Cl. ........................ 264/540; 264/542; 425/532; 425/534
[58] Field of Search .................................. 425/532, 534, 425/522; 264/540, 542

[56] References Cited

U.S. PATENT DOCUMENTS

| | | | |
|---|---|---|---|
| 5,030,083 | 7/1991 | Kohno et al. | 425/532 |
| 5,264,178 | 11/1993 | Yamamura et al. | 264/531 |
| 5,464,635 | 11/1995 | Geiger | 425/532 |
| 5,589,205 | 12/1996 | Ishikawa et al. | 425/532 |
| 5,662,842 | 9/1997 | Sadr et al. | 425/532 |
| 5,695,711 | 12/1997 | Geiger | 425/532 |
| 5,792,490 | 8/1998 | Geiger | 425/532 |
| 5,814,269 | 9/1998 | Geiger | 425/532 |

FOREIGN PATENT DOCUMENTS

| | | |
|---|---|---|
| 37 37 453A1 | 5/1988 | Germany . |
| 43 05 735C1 | 5/1994 | Germany . |
| 2-117808 | 5/1990 | Japan .................................... 425/522 |
| 5-117810 | 5/1990 | Japan .................................... 425/522 |
| 3-193326 | 8/1991 | Japan .................................... 425/532 |
| 3-261534 | 11/1991 | Japan .................................... 425/534 |
| 3-281325 | 12/1991 | Japan . |
| 3-293112 | 12/1991 | Japan .................................... 425/540 |
| 6-047803 | 2/1994 | Japan . |
| 96/28295 | 9/1996 | WIPO . |

*Primary Examiner*—Robert Davis
*Attorney, Agent, or Firm*—Seidel, Gonda, Lavorgna & Monaco, PC

[57] ABSTRACT

In a process and apparatus for producing elongate curved hollow bodies at least partially comprising thermoplastic material a preform is extruded from an extrusion system head and engaged by a gripping means. The preform is moved by the gripping means into the region of a guide stencil disposed above the mold cavity of a mold portion of a divided blow molding mold and introduced into the mold cavity by a simultaneous downward movement of the gripping means and a movement following the configuration of the guide stencil. The guide stencil has two mutually opposite walls, the spacing of which increases in an upward direction and the spacing of which at the bottom of the guide stencil approximately corresponds to the maximum width of the mold cavity. The preform is thus guided towards the mold cavity by the walls, acquiring its definitive orientation with respect thereto by virtue of such guidance, passing through a lower opening in the guide stencil into the mold cavity. The mold is closed and the preform expanded therein by an increased internal pressure in the preform.

9 Claims, 3 Drawing Sheets

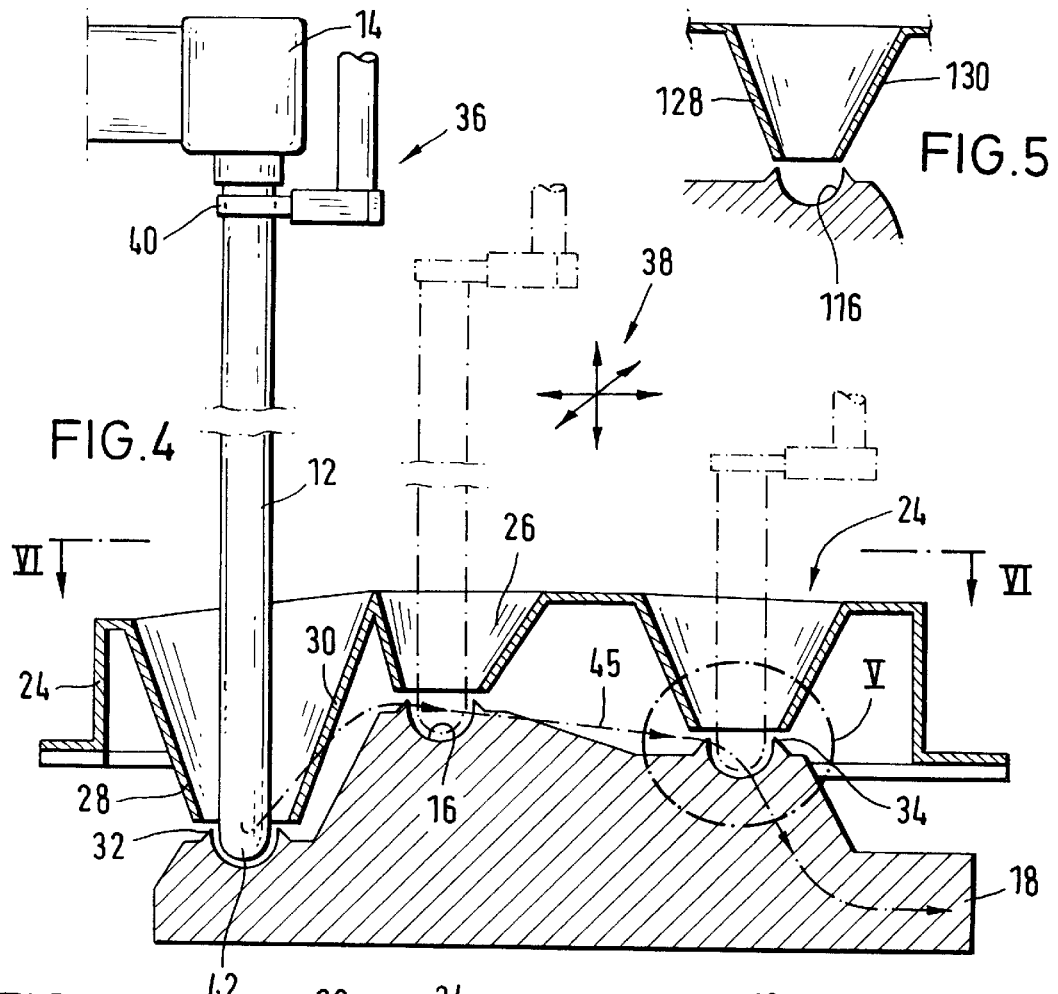
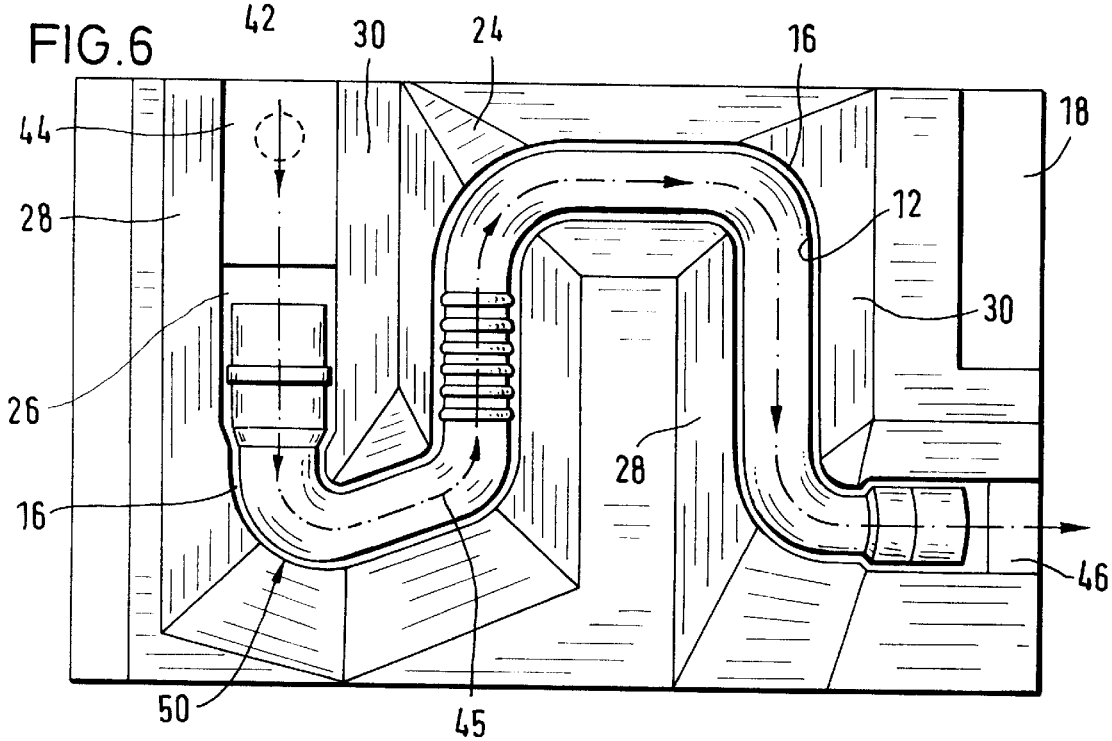

PROCESS AND APPARATUS FOR PRODUCING CURVED HOLLOW BODIES OF THERMOPLASTIC MATERIAL

FIELD OF THE INVENTION

The invention concerns a process and an apparatus for producing elongate curved hollow bodies, more particularly for example tubes or pipes which involve a multi-axis curvature, which at least partially comprise thermoplastic material.

BACKGROUND OF THE INVENTION

In the production of elongate hollow bodies, for example pipes or tubes or similar parts, which are of a complicated configuration and which more especially involve three-axis curvature, using an extrusion blow molding procedure, a typical mode of operation involves the preform which is generally of a tubular nature being introduced into the mold cavity of a mold portion which is disposed at least in part in a horizontal position, of a blow molding mold having two or more portions, in such a way that prior to the commencement of the blow molding operation the preform, following the shape of the mold cavity which is of a correspondingly complicated configuration to that required for the hollow body to be produced, at least over large parts of the longitudinal extent of the preform, is disposed within the mold cavity, that is to say between the two boundary edges extending in the longitudinal direction of the mold cavity, and thus the preform does not involve a larger diameter than corresponds to the width of the mold cavity. That arrangement and relationship provide that, when the blow molding mold is closed by the two or more mold portions being moved towards each other, no or only a little surplus material is squeezed off the preform or the hollow body to be produced therefrom, that is to say along the longitudinal extent of the lateral boundary edges of the mold cavity. That avoids the occurrence of waste pieces and also weak points on the finished hollow body.

After the blow molding mold is closed the preform is expanded by an increased internal pressure therein in the usual manner, but in the production of tubular hollow bodies the extent of that expansion of the preform is generally not very great.

The operation of fitting the preform into the mold cavity is usually implemented in such a way that either the extruder with the extrusion head that produces the preform is moved with respect to the stationary mold portion which receives the preform, with such movement being adapted to the configuration of the mold cavity so that the preform is suitably laid therein, or the mold portion is moved in a horizontal plane with respect to the extrusion head which is movable vertically, that is to say which can be lowered, in order to lay the extruded preform into the mold cavity. Both cases involve moving considerable masses, with the consequence that the drive arrangements required for that purpose are also of a correspondingly complicated and expensive nature.

Reference may be made at this point to DE 43 05 735 C1 disclosing an operating procedure whereby, in an extrusion blow molding apparatus for the production of multi-axis hollow bodies of plastic material, arranged between the extrusion head of the apparatus and the blow molding mold is a preliminary mold which is adapted to the configuration of the mold cavity of the blow molding mold and which has an open mold trough member which, at least in the tubular preform-receiving position thereof is displaceable under the extrusion head in two horizontal directions and can be raised and lowered in a vertical direction. That preliminary mold firstly receives the preform in order then to discharge it to the mold cavity of the blow molding mold portion which is disposed in a horizontal position. That design configuration admittedly avoids movement of the heavy blow molding mold and movement of the extruder in a horizontal plane, but for that purpose the apparatus requires the special mold trough member referred to above, which in addition must be so designed that, when the preform is transferred into the mold cavity of the blow molding mold, the preform always remains in the correct position and is not subjected to any unacceptable loadings.

SUMMARY OF THE INVENTION

An object of the present invention is to provide a process for producing elongate curved hollow bodies such as tubes or pipes of a multi-axis curvature which at least partially comprise thermoplastic material, which involves the movement of only small masses without a reduction in the degree of accuracy with which a preform can be fitted into a mold cavity of a mold portion for receiving it.

Another object of the present invention is to provide a process for producing elongate curved hollow bodies which involves a straightforward operating procedure that is simple to implement for fitting an extruded preform into a mold cavity in the correct position therein for subsequent blow molding thereof.

Still another object of the present invention is to provide a process for producing elongate curved hollow bodies using means which are simple in terms of manufacture and handling so that they can be largely disregarded in cost terms.

Still a further object of the present invention is to provide ai apparatus for producing elongate curved hollow bodies which involves simplified apparatus structure while not sacrificing the accuracy for fitting a preform into a mold cavity of a mold portion in which the preform is to be expanded to result in the hollow body.

In accordance with the principles of the present invention the foregoing and other objects are achieved by a process for producing elongate curved hollow bodies, for example tubes or pipes involving a multi-axis curvature, which at least partially comprise thermoplastic material, wherein firstly a preform is extruded from an extrusion head of an extrusion system and put into the mold cavity of a mold portion of a divided blow molding mold which is so arranged that the surface of the mold cavity carrying the preform includes a horizontal component at least on a part of its longitudinal extent, whereupon after closure of the blow molding mold the preform is pressed therein by an increased internal pressure against the wall of the mold cavity of the closed blow molding mold. To put the preform into the mold cavity the preform is engaged by a gripper which is movable in space and the preform is moved into the region of a guide stencil or template arranged above the mold cavity of the mold portion receiving the preform. By a downward movement of the gripper and by a movement following the configuration of the guide stencil or template the preform is introduced into the guide stencil or template which has first and second walls disposed at a spacing from each other, the spacing thereof increasing in an upward direction, wherein the spacing at the underside of the guide stencil or template approximately corresponds to the maximum width of the mold cavity. The guide stencil or template has a lower opening between the walls thereof at the lower ends thereof. The preform acquires its definitive orientation relative to the mold cavity of the blow molding mold portion by the action of the guide stencil or template, through the lower opening of which it passes into the mold cavity.

Further in accordance with the principles of the invention in the apparatus aspect the foregoing and other objects are achieved by an extrusion blow molding apparatus for the production of elongate curved hollow bodies, for example pipes or tubes involving a multi-axis curvature, which at least partially comprise thermoplastic material, comprising an extrusion system including an extrusion head, and a blow molding mold which is divided at least into first and second mold portions and having a mold cavity which corresponds to the desired shape of the hollow body to be produced and which when receiving the tubular preform to be inserted into the mold cavity of a mold portion is so arranged that the surface of the mold cavity that carries the preform includes a horizontal component at least on part of its longitudinal extent. A guide stencil or template for the preform extends above the blow molding mold along at least a part of the mold cavity of the portion of the blow molding mold which is in the preform-receiving position. The guide stencil or template includes first and second wall portions which are disposed at a spacing from each other and which transversely with respect to the longitudinal configuration of the mold cavity are at a spacing that increases in an upward direction and which open at the underside of the guide stencil or template with an opening that at least approximately corresponds to the transverse dimension or diameter of the preform. The apparatus further comprises a gripping means which is adapted to remove the preform from the extrusion head and introduce it into the guide stencil or template, the gripping means being movable in space in order to follow the configuration of the guide stencil or template when inserting the preform. The guide stencil or template is adapted to move between an operative position in which it is above the mold cavity and a position in which it is outside the region of movement of the blow molding mold portions upon closing movements thereof.

As will be apparent from the description hereinafter of preferred embodiments of the invention, when using the gripping means for introducing the preform into the mold cavity, the preform is firstly extruded to its entire length before it can be put into the mold cavity. It will be apparent that in the first phase of that operation for putting the preform into the mold cavity, when the portion of the preform that is still held by the gripping means is relatively long, the respective lower region of the preform adjoining the portion thereof which is already in the mold cavity follows the lateral movements of the gripping means which are determined by the configuration of the mold cavity, only with a certain delay. It will be appreciated that a reduction in the speed at which the operation of fitting the preform into the mold cavity, which may be caused under some circumstances by the above-mentioned delay, can be at least substantially eliminated by virtue of the presence of the guide stencil or template as, by virtue of the latter, there is no longer any need for the gripping means to follow the configuration of the mold cavity with a great degree of accuracy. On the contrary it is normally sufficient for the preform to be put into the upper region of the guide stencil or template, which region is substantially wider than the mold cavity and thus permits a certain amount of tolerance in regard to the movements of the preform. In any case, the preform moves under the effect of its weight towards the mold cavity through the downwardly constricting guide configuration formed by the walls of the guide stencil or template towards the lower opening thereof, in which case the preform is positively oriented with respect to the mold cavity and finally slides into same under the effect of its own weight.

The consequence of using a gripping means for transporting the preform into the blow molding mold portion for receiving it is that only small masses need to be moved. In addition it is possible for the gripping means to be arranged and moved independently of the extrusion system and the blow molding mold, so that the motorised drive means required for moving the gripping means can be simple and light. Furthermore the arrangement and mounting thereof are also uncomplicated as no account has to be taken of the presence of other parts and drives.

As the guide stencil or template is not exposed to any loadings and in particular does not need to carry any forces whatsoever, it can be of a simple light structure and can be made for example from sheet metal or plastic material. The simplicity of the guide stencil or template and the low level of expenditure required for same make the process and apparatus in accordance with the invention particularly suitable also for use when producing small-scale production series of elongate curved hollow bodies.

A further advantage of the invention is that the operation of putting the preform into the mold cavity of the mold portion for receiving same can be implemented independently of the extrusion speed, that is to say possibly in a shorter period of time than in the case of prior processes in which the preform is extruded directly into the mold cavity.

The advantage which can be achieved by means of the invention becomes particularly clear when dealing with those materials which in the hot-plastic condition are of comparatively great viscosity and therefore result in realtively stiff preforms. The viscosity thereof generally depends on the nature of the plastic material to be processed. It can however also be influenced by components or substances, for example glass fibers, which are added to the plastic material. In that respect the guide stencil or template can make it possible to move the gripping means with the shortest possible control movements in order to prevent bending of the preform even when making tight curves and in order thus reliably to put the preform into the mold, in spite of the stiffness of the preform.

At any event the use of the guide stencil or template provides that, when the preform is being fitted into the mold cavity by the gripping means, there is no need for the preform to be accurately oriented with respect to the configuration of the mold cavity. It is only necessary to follow the configuration of the guide stencil or template which at its top is very much wider than the mold cavity itself, by virtue of the divergent configuration of the walls defining the space into which the preform is laid. Precise orientation of the preform relative to the mold cavity is then effected by the preform sliding through the space defined by the walls of the guide stencil or template, into the mold cavity which is disposed therebeneath, so that the inclinedly extending walls of the guide stencil or template provide for a kind of centering effect for the preform relative to the mold cavity.

It is also possible for a certain, downwardly directed pressure to be applied to the tubular member or preform disposed in the guide stencil or template in order to accelerate the sliding movement of the preform into the mold cavity and possibly also to render such sliding movement more uniform. Depending on the configuration of the mold cavity and therewith also the nature of the guide stencil or template, it is possible, particularly when dealing with materials of higher viscosity, that portions of the preform, which are disposed in regions of small-radius curves in the mold cavity or the guide stencil or template, slide into the mold cavity more slowly than is the case with portions of the preform which are disposed in straight or less severely curved regions of the guide stencil or template. It will be noted in any case, that is to say irrespective of whether an additional pressure is or is not applied to the preform or portions thereof, in particular in small-radius curved regions, the procedure involved in introducing the preform into the mold cavity is substantially simplified and speeded up by virtue of using the present invention.

Further objects, features and advantages of the invention will be apparent from the following description of preferred embodiments thereof.

BRIEF DESCRIPTION OF THE DRAWING

FIG. 4 is a partly sectional view of a blow molding mold portion arranged in a lying position, with a guide stencil or template arranged thereabove, FIG. 5 is a view corresponding to the part indicated by V in FIG. 4, showing only the blow molding mold portion and the guide stencil of a second embodiment, FIG. 6 is a view in the direction of the arrows VI—VI in FIG. 4.

DESCRIPTION OF THE PREFERRED EMBODIMENTS

Figure 1:
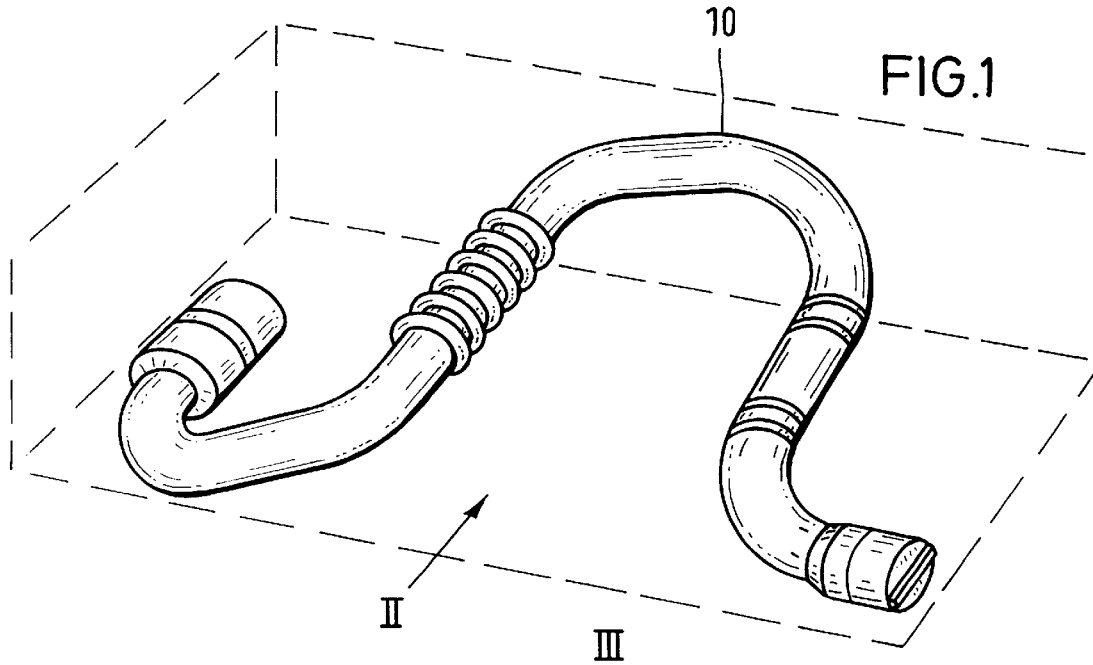
FIG. 1 is a perspective view of a curved hollow body in tube form.
Figure 2:
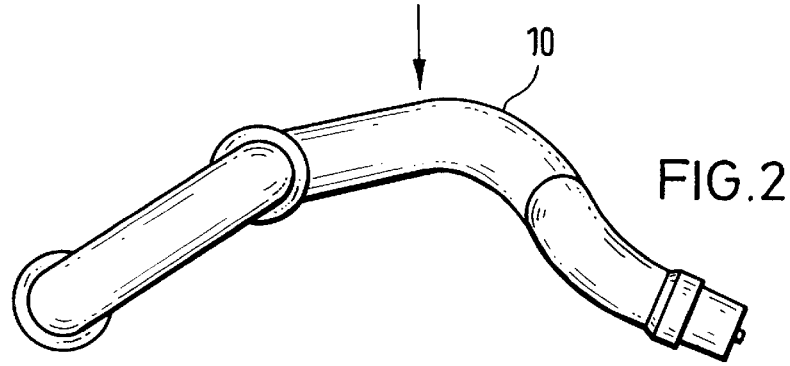
FIG. 2 is a view of the hollow body of FIG. 1 viewing approximately in the direction of the arrow II in FIG. 1.
Figure 3:
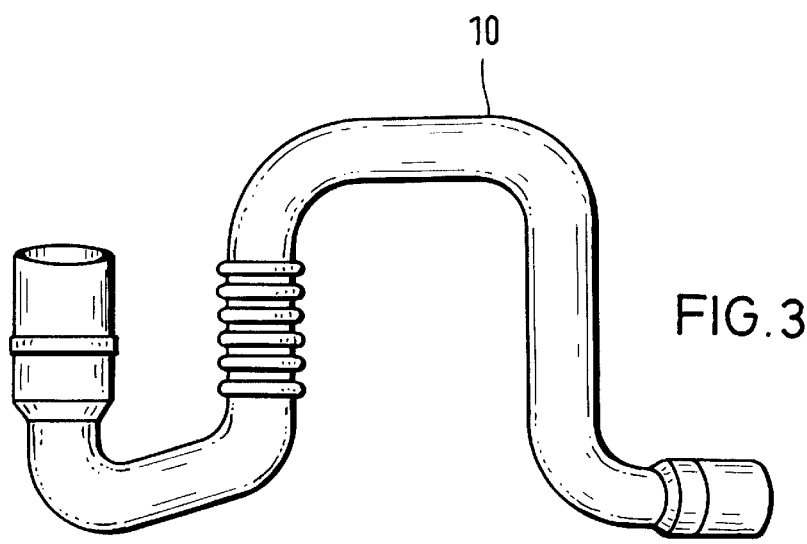
FIG. 3 is a view of the hollow body of FIG. 1 viewing approximately in the direction of the arrow III in FIG. 2.

Referring firstly to FIGS. 1 through 3, the elongate curved hollow body 10 which is shown therein in the form of a tube or pipe merely by way of example of the present invention is of a highly irregular configuration and in particular involves multiple curvatures in space.

Referring now also to FIG. 4, to produce the hollow body 10 shown in FIGS. 1 through 3, a tubular preform 12 which is extruded from an extrusion head 14 of an extrusion system of which only part is shown in the drawing but is not referenced is firstly put into the mold cavity indicated at 16 of a lower mold portion 18 of a blow molding mold and then, after closure of the blow molding mold comprising the two mold portions 18 and 20, expanded in the mold cavity 16 therein by an increased internal pressure to constitute the required hollow body.

FIG. 6 in particular shows that the mold cavity 16 in the lower mold portion 18 is of a configuration involving multiple curvature in space, corresponding to the required configuration of the hollow body 10. The configuration of the mold cavity 16 requires the preform 12 to be put into the mold cavity 16, precisely following the mold cavity configuration, if the problem of surplus material on the preform at the sides thereof being squeezed off same is to be avoided. That means that the preform is of an outside transverse dimension or diameter which is not greater but without exception smaller than the greatest width or diameter of the mold cavity 16. In that respect it will be appreciated that account is to be taken of the fact that, when it is introduced into the mold cavity 16, the preform 12 is not normally of an absolutely circular and uniform cross-section over its entire length, although it is held under a slightly increased internal pressure which possibly prevents the preform 12 from collapsing into itself.

Figure 7:
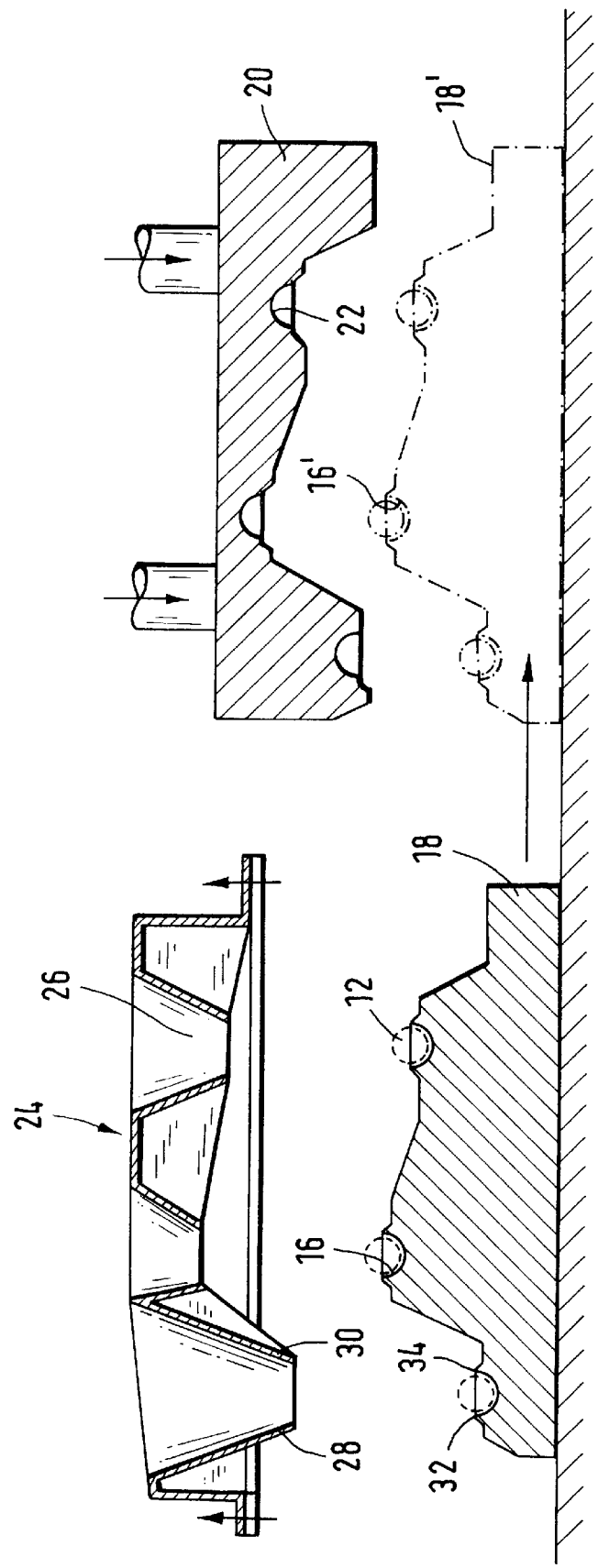
FIG. 7 is a view corresponding to FIG. 4 of the two-part blow molding mold with a guide stencil which has been removed from the region of the opening and closing movements of the mold portions.

The lower mold portion 18 is movable between the position shown in solid lines at the left in FIG. 7 which corresponds to the position illustrated in FIGS. 4 and 6, and the position 18' illustrated in dash-dotted line at the right in FIG. 7, in a horizontal plane, with a reciprocating movement between those two positions. In the right-hand position 18' the lower mold portion is disposed beneath the upper mold portion 20 which is reciprocable between an upper position as shown in FIG. 7 and a lower position in which it bears against the lower blow molding portion 18. When the upper mold portion 20 is in the lower position, the blow molding mold is closed, in which case the mold cavity 16 or 16' in the lower blow molding mold portion 18 co-operates with the mold cavity indicated at 22 in the upper blow molding mold portion 20 to constitute the complete mold cavity within which the preform 12 is expanded to form the finished hollow body.

In the position of the lower mold portion 18 shown in FIGS. 4 and 6 and in solid lines in FIG. 7, it is displaced laterally with respect to the upper mold portion 20 so as to be accessible from above in order to be able to introduce the preform 12 into the mold cavity 16. For that purpose, disposed directly above the lower mold portion 18 which is in the preform-receiving position is a guide stencil or template 24.

The guide stencil or template 24 will be referred to herein for the sake of greater convenience and brevity as the guide stencil.

The guide stencil 24 can be considered in the form of a channel as indicated at 26 which is open downwardly and which is of a cross-section that constricts in a tapering configuration in a downward direction, while the lengthwise configuration of the channel 26 defined by the guide stencil 24 corresponds at least in the lower narrowest region of the channel configuration 26 to the longitudinal configuration of the mold cavity 16. In this respect, in the case of the structure shown in FIGS. 4, 6 and 7, the arrangement is such that the width in the lower narrowest region of the channel configuration 26, that is to say the internal spacing of the first and second walls indicated at 28 and 30 defining the channel 26, approximately corresponds to the spacing of the two edges 32, 34 disposed therebeneath, that define the mold cavity 16 in the lower mold portion 18.

Referring now again to FIG. 4 operatively associated with the extrusion head 14 is a gripping means 36 which can be moved in space as is indicated by the arrows 38. The gripping means 36 serves by means of the gripper portions 40 to engage the preform 12 at its upper end region, when it is in the condition of hanging down from the extrusion head 14 from which it has been extruded, so that the preform can be detached from the material which is subsequently flowing out of the extrusion head 14, possibly being torn away, and can then be transported for example initially perpendicularly to the plane of the drawing in FIG. 4, and towards the lower mold portion 18 which is in the preform-receiving position, and after reaching the initial position for the operation of fitting the preform into the mold cavity of the mold portion 18, the preform can be introduced into the channel 26 of the guide stencil 24. In the embodiment illustrated in the drawing, this is effected in such a way that the free end indicated at 42 in FIG. 4 of the preform 12, beginning in the region of the end indicated at 44 in FIG. 6 of the channel 26, is put into the guide stencil 24 by virtue of a suitable downward movement of the gripping means 36 and then, following the configuration of the channel 26 and therewith the mold cavity 16, and with continuing further downward movement, as illustrated in dash-dotted lines in FIG. 4, approximately following the line indicated at 45 in FIGS. 4 and 6, is continuously deposited in the channel 26 until, when the gripping means 36 reaches its lowest position, above the other end region 46 of the channel 26 and therewith the mold cavity 16, the gripper members 40 of the gripping means 36 are opened so that the gripping means 36 releases the preform whereby the latter is disposed over its entire length in the channel 26 of the guide stencil 24 and thus the mold cavity 16, which is disposed therebeneath, of the lower mold portion 18.

FIG. 4 in particular shows that, by virtue of the upwardly enlarging cross-sectional configuration defined by the channel 26 of the guide stencil 24, the degree of accuracy with which the preform 12 has to be deposited in the guide stencil 24 by the gripping means 36 does not need to be very great as the two walls 28, 30 of the channel 26 positively orient the preform in the course of the downward movement thereof in the channel, with respect to the mold cavity 16 disposed therebeneath, so that at any event when encountering the wall defining the mold cavity 16 the preform 12 assumes the correct position therein. The preform 12 is thus fed by the convergent walls 28, 30 through the lower opening defined at the bottom of the channel 26 of the guide stencil 24, into the mold cavity 16. It will be noted that when dealing with materials of high viscosity, there is perhaps also the possibility of performing additional measures for pushing the tubular preform, after it has been deposited in the channel 26, downwardly into the mold cavity 16. In that case, a slightly increased internal pressure in the preform 12 can be used to ensure that, in that procedure, the preform does not experience inadmissible deformation. Air to provide the preform-supporting effect by virtue of the increased pressure therein can be introduced into the preform 12 in the usual manner through a nozzle which at the beginning of the operation of putting the preform 12 into the mold cavity 16, is introduced into the lower free end of the preform 12 which is thereupon closed in a suitable fashion, for example by other gripping means, by being pressed against the wall of the nozzle. That procedure involves generally known steps which therefore do not need to be described in greater detail herein.

After termination of the operation of introducing the preform 12 into the mold cavity 16 the guide stencil 24 is removed from the lower mold portion 18 in any suitable fashion. That can be effected by displacement upwardly, as shown in FIG. 7. It is however also possible for the guide stencil 24 to be removed in some other fashion, for example by a pivotal movement, from the region of the lower mold portion 18 which is then displaced towards the right into the position indicated by dash-dotted lines at 18' in FIG. 7. The blow molding mold is then closed by the downward movement of the upper mold portion 20, as already referred to above, in order for the preform 12 to be expanded by an increased internal pressure to constitute the finished hollow body.

In the embodiment shown in FIG. 5 which is the same in all essential parts as the embodiment shown in FIGS. 4, 6 and 7 so that the same parts are also denoted by the same references but each increased by 100, the two mutually opposite walls 128, 130 are arranged in such a way that the lower opening is somewhat smaller in width than the widest part of the mold cavity 116. Consequently in the embodiment of FIG. 5 the maximum transverse dimension or diameter of the preform must also possibly be somewhat smaller. This can have the advantageous effect that in curved parts of the mold cavity, which involve a very small radius, such as for example the curvature indicated at 50 in FIG. 6, the preform passes smoothly and unimpededly into the mold cavity, in spite of the upsetting effect which occurs by virtue of the curvature at the inward side thereof, and in particular it does not come to bear under a pressure loading against its wall which defines the curvature at the inward side.

The guide stencil 24 can be easily made from sheet metal or plastic material. It represents a simple item of ancillary equipment which can be used without additional significant measures and without adversely affecting the mode of operation involved in producing the hollow body from the preform, in order to speed up and facilitate the operation of introducing the preform 12 into the mold cavity 16 in the lower mold portion 18, particularly when dealing with a mold cavity of a very complicated configuration.

By virtue of the topography of the lower mold portion 18 the lower boundary of the guide stencil 24 will not normally be in one plane. This however does not exclude the upper boundary of the guide stencil being in one plane although that is not absolutely necessary for manufacturing reasons. On the other hand there is no disadvantage in the channel 26 being of depths which vary over the longitudinal extent thereof. The important consideration here is that the channel 26 is of such a width at its upper end that the tubular preform can be introduced into the channel 26 without serious difficulty, even when the mold cavity is of a complicated configuration.

It will be appreciated that the above-described embodiments of the process and apparatus according to the invention have been set forth solely by way of example and illustration of the principles thereof and that various other modifications and alterations may be made therein without thereby departing from the spirit and scope of the invention.

What is claimed is:

1. A process for producing elongate curved hollow bodies at least partially comprising thermoplastic material wherein firstly a preform is extruded from an extrusion head of an extrusion system, the preform is engaged by a gripping means which is movable in space, the preform is moved by the gripping means into the region of a guide stencil extending above the length of the mold cavity of a mold portion of a divided blow molding mold for receiving the preform, the blow molding mold being so arranged that the mold cavity surface for carrying the preform includes at least one portion longitudinal extending along the same horizontal plane, the preform is introduced into the top of the guide stencil by a downward movement of the gripping means and by a movement thereof following the configuration of the guide stencil, the guide stencil having first and second wall portions disposed at a spacing from each other and the spacing thereof increasing in an upward direction, the spacing at the bottom of the guide stencil approximately corresponding to the maximum width of the mold cavity, the spacing at the top of the guide stencil greater than the spacing at the bottom of the guide stencil, whereby the preform is guided by the guide stencil from the top towards the mold cavity in a definitive orientation relative thereto, the preform passing into the mold cavity through a lower opening in the bottom of said guide stencil towards which said preform is guided by said wall portions, the preform having a larger diameter than the depth of the mold cavity, the blow molding mold is closed, and the preform in the closed blow molding mold is pressed by an increased internal pressure in the preform against the wall of the mold cavity thereby to form the hollow body therefrom.

2. A process as set forth in claim 1 wherein the preform has a free end remote from said extrusion head and said free end is fixed by a holding means at the beginning of the operation of introducing the preform into the mold cavity.

3. A process as set forth in claim 1 wherein the preform is subjected to an increased internal pressure therein during the operation of introducing the preform into the mold cavity.

4. A process for producing elongated curved hollow bodies at least partially comprising thermoplastic material wherein firstly a preform is extruded from an extrusion head of an system, the preform is engaged by a gripping means which is movable in space, the preform is moved by the gripping means into the region of a guide stencil arranged above the mold cavity of a mold portion of a divided blow molding mold for receiving the preform, the blow molding mold being so arranged that the mold cavity surface for carrying the preform includes a horizontal component at least on part of its longitudinal extent, the preform is introduced into the stencil by a downward movement of the gripping means and by a movement thereof following the configuration of the guide stencil, the guide stencil having first and second wall portions disposed at a spacing from each other and the spacing thereof increasing in an upward direction, the spacing at the bottom of the guide stencil approximately corresponding to the maximum width of the mold cavity whereby the preform is guided by the guide stencil towards the mold cavity in a definitive orientation relative thereto, the preform passing into the mold cavity through a lower opening in said guide stencil towards which said preform is guided by said wall portions, the blow molding mold is closed, and the preform in the closed blow molding mold is pressed by an increased internal pressure in the preform against the wall of the mold cacity thereby to form the hollow body therefrom, wherein the preform is pressed into the mold cavity by an additional means acting thereon from above through the guide stencil.

5. A process as set forth in claim 4 wherein the operation of pressing the preform into the mold cavity is effected after termination of the operation of introducing the preform into the guide stencil by the gripping means.

6. A process as set forth in claim 4 wherein the operation of pressing the preform into the mold cavity is effected in the course of the operation of introducing the preform into the guide stencil by the gripping means, following same.

7. An extrusion blow molding apparatus for the production of elongate curved hollow bodies which at least partially comprise thermoplastic material, including an extrusion system including an extrusion head, a blow molding mold which is divided at least into first and second mold portions and having a mold cavity which corresponds to the desired shape of the hollow body to be produced and which when receiving the tubular preform to be inserted into the mold cavity of a mold portion is so arranged that the mold cavity surface that carries the preform includes at least one portion longitudinally extending in the same horizontal plane a guide stencil for the preform, the guide stencil extending above the blow molding mold along the length of the mold cavity of the mold portion which is in the preform-receiving position, said guide stencil including first and second spaced-apart wall portions which transversely with respect to the longitudinal configuration of the mold cavity are at a spacing which increases in an upward direction, wherein an open topside has a greater transverse dimension than an open underside, the open underside of the guide stencil at least approximately corresponds to the maximum transverse dimension of the mold cavity, a gripping means adapted to engage the preform from the extrusion head and introduce it into the guide stencil and movable in space in order to follow the configuration of the open topside of the guide stencil when inserting the preform, and means for moving the guide stencil between an operative position in which it is above the mold cavity and a position in which it is outside the region of movement of the blow molding mold portions upon closing movement thereof.

8. Apparatus as set forth in claim 7 wherein the lower opening of the guide stencil is of a width which is somewhat smaller than the width of the mold cavity.

9. An extrusion blow molding apparatus for the production of elongate curved hollow bodies which at least partially comprise thermoplastic material, including an extrusion system including an extrusion head, a blow molding mold which is divided at least into first and second mold portions and having a mold cavity which corresponds to the desired shape of the hollow body to be produced and which when receiving the tubular preform to be inserted into the mold cavity of a mold portion is so arranged that the mold cavity surface that carries the preform includes at least two portions longitudinally extending in different planes, a guide stencil for the preform, the guide stencil extending above the blow molding mold along the whole length of the mold cavity of the mold portion which is in the preform-receiving position, said guide stencil including first and second spaced-apart wall portions which transversely with respect to the longitudinal configuration of the mold cavity are at a spacing which decreases in an downward direction, wherein an open topside has a greater transverse dimension than an open underside, the open underside of the guide stencil at least approximately corresponds to the transverse dimension of the preform, a gripping means adapted to engage the preform from the extrusion head and introduce it into the guide stencil and movable in space in order to follow the configuration of the open topside of the guide stencil when inserting the preform, and means for moving the guide stencil between an operative position in which it is above the mold cavity and a position in which it is outside the region of movement of the blow molding mold portions upon closing movement thereof.

* * * * *